(12) United States Patent
Detloff

(10) Patent No.: US 9,543,818 B2
(45) Date of Patent: Jan. 10, 2017

(54) FERROFLUID MOTOR

(71) Applicant: The Boeing Company, Chicago, IL (US)

(72) Inventor: Shaun Detloff, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 539 days.

(21) Appl. No.: 14/027,240

(22) Filed: Sep. 15, 2013

(65) Prior Publication Data

US 2015/0076960 A1    Mar. 19, 2015

(51) Int. Cl.
*H02K 44/00* (2006.01)
*H02K 99/00* (2014.01)

(52) U.S. Cl.
CPC ............ *H02K 57/006* (2013.01); *H02K 44/00* (2013.01)

(58) Field of Classification Search
CPC .................................................. H02K 57/006
USPC .................................................. 310/11, 273
See application file for complete search history.

(56) References Cited

U.S. PATENT DOCUMENTS

| | | | |
|---|---|---|---|
| 2,886,151 A | 5/1959 | Winslow | |
| 4,065,234 A | 12/1977 | Yoshiyuki et al. | |
| 4,687,418 A * | 8/1987 | Gotou | H02K 44/04 310/11 |
| 4,935,650 A | 6/1990 | Hannan, III | |
| 5,298,818 A * | 3/1994 | Tada | H02K 44/04 290/42 |
| 5,598,908 A | 2/1997 | York et al. | |
| 6,318,531 B1 | 11/2001 | Usoro et al. | |
| 7,007,560 B2 | 3/2006 | Anderson | |
| 8,210,572 B2 | 7/2012 | Davis | |
| 2006/0091731 A1 | 5/2006 | Haje et al. | |
| 2015/0076960 A1 | 3/2015 | Detloff | |

FOREIGN PATENT DOCUMENTS

| | | |
|---|---|---|
| CA | 2145007 A1 | 9/1996 |
| CN | 102664511 A | 9/2012 |
| EP | 0170163 A1 | 2/1986 |
| EP | 1446644 B1 | 7/2008 |
| EP | 2849322 A2 | 3/2015 |

OTHER PUBLICATIONS

Extended European Search Report issued in European Patent Application No. 14184786.3 dated Oct. 27, 2015.
Office Action issued in Canadian Patent Application No. 2,855,332 dated Sep. 16, 2015.
Anton et al., "Ferrofluid Flow Under the Influence of Rotating Magnetic Fields", IEEE Transactions on Magnetics, vol. Mag-16, No. 2, Mar. 1980.
Canadian Office Action and Examination Search Report for Canadian Application No. 2,855,332, dated Aug. 19, 2016 (5 pages).

* cited by examiner

*Primary Examiner* — Hanh Nguyen
(74) *Attorney, Agent, or Firm* — McDonnell Boehnen Hulbert & Berghoff LLP

(57) ABSTRACT

A ferrofluid electric motor and methods are presented. A magnetic field is generated by an electromagnet, a flow of a ferrofluid is induced in response to the magnetic field, and a turbine is rotated by the flow of the ferrofluid.

20 Claims, 7 Drawing Sheets

FERROFLUID MOTOR

FIELD

Embodiments of the present disclosure relate generally to electric motors. More particularly, embodiments of the present disclosure relate to electric motors comprising ferrofluid.

BACKGROUND

A ferrofluid generally comprises a liquid which becomes magnetized in a presence of a magnetic field. Ferrofluids are generally a colloidal mixture of ferromagnetic or ferrimagnetic particles suspended in a carrier fluid. The carrier fluid may comprise, without limitation, an organic solvent, water, or other suitable fluid. Particles of the ferrofluid may be coated with a surfactant coating the particles to inhibit clumping. Ferrofluids may be manipulated by magnetic fields, but generally do not retain magnetization absent a magnetic field.

SUMMARY

A ferrofluid motor and methods are presented. A magnetic field is generated by an electromagnet, a flow of a ferrofluid is induced in response to the magnetic field, and a turbine is rotated by the flow of the ferrofluid.

In this manner, an electric ferrofluid motor provides a rotary motion by using solely a rotating ferrofluid. The ferrofluid motor provides rotary motion utilizing a rotating electromagnetic field to impart a rotational motion on a ferromagnetic fluid. The rotational inertia of the ferromagnetic fluid is transferred to an output shaft. This will allow for torque to be applied to an output of the ferrofluid motor with the only moving part being the ferromagnetic fluid.

In an embodiment, a magnetic field is generated by a first electromagnet, a flow of a ferrofluid is induced in response to the magnetic field, and a turbine is rotated by the flow of the ferrofluid.

In another embodiment, a ferrofluid electric motor comprises a ferrofluid, a contained volume, at least one active electromagnet stator and a turbine. The ferrofluid is configured to flow in response to an induced magnetic field. The contained volume is configured to contain the flow of the ferrofluid. The at least one active electromagnet stator is configured to generate the induced magnetic field, and the turbine is configured to rotate in response to the flow of the ferrofluid.

In a further embodiment, a method to produce a ferrofluid electrical motor configures a ferrofluid to flow in response to an induced magnetic field, and configures a contained volume to contain the flow of the ferrofluid. The method further configures at least one active electromagnet in contact with the ferrofluid to generate the induced magnetic field; and configures a turbine to rotate in response to the flow of the ferrofluid.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
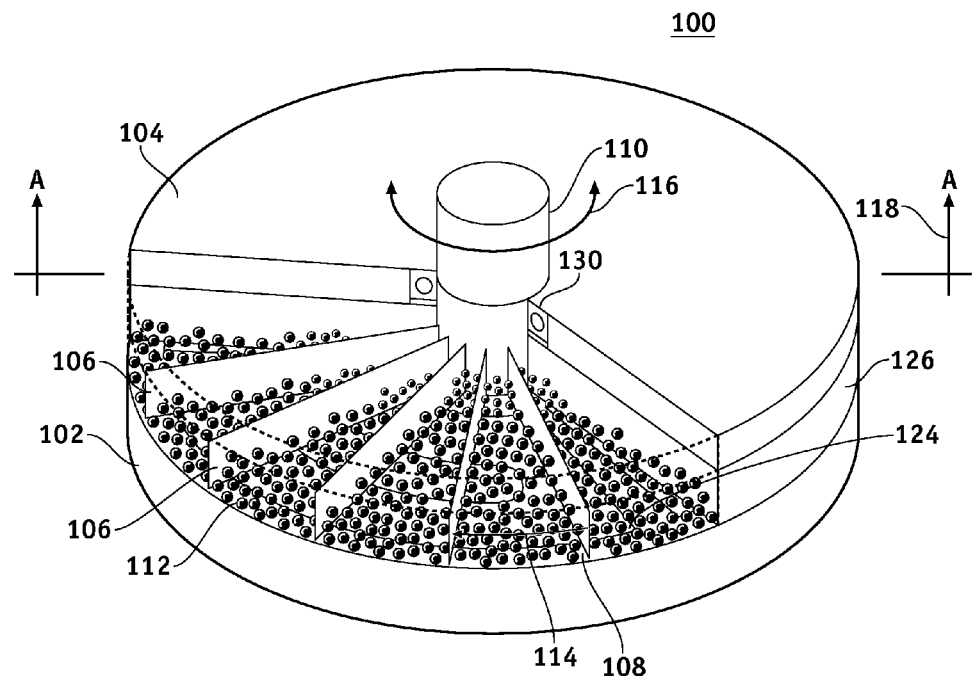
FIG. 1 is an illustration of an exemplary ferrofluid motor according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to electric motors and ferrofluid may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of some non-limiting applications, namely, an aircraft electric motor. Embodiments of the disclosure, however, are not limited to such aircraft electric motor applications, and the techniques described herein may also be utilized in other applications. For example, embodiments may be applicable to an automotive electric motor, an industrial electric motor, a ship electrical motor, a submarine electrical motor, a spacecraft electrical motor, a consumer product electrical motor, or other electrical motor applications.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

A standard electric motor imparts a force across a gap between stator and rotor which can cause energy loss. In contrast to conventional electric motors, embodiments of the disclosure provide a ferrofluid electric motor configured to rotate ferrofluid itself to generate rotation of an output shaft. Embodiments provide rotational motion of the output shaft using pressure generated by an influence of an electromagnetic field on the ferrofluid generated by an active stator coil, allowing essentially zero gap between the active stator coil and the fluid upon which it is acting.

FIG. 1 is an illustration of an exemplary ferrofluid electric motor 100 according to an embodiment of the disclosure. The ferrofluid electric motor 100 may comprise: an active electromagnet stator 102, a passive stator 104, a turbine 106, a contained volume 108, an output shaft 110, a ferromagnetic fluid 112, and a magnetic shield housing 126. The ferrofluid electric motor 100 described herein is configured to rotate the ferromagnetic fluid 112 to generate rotation of the output shaft 110.

The ferrofluid electric motor 100 is simple with predictable reliability and may be used as a drive motor for various applications. For example but without limitation, the ferrofluid electric motor 100 may be used as a landing gear drive motor on an aircraft to save fuel during taxi, an actuator, or other application.

The ferrofluid electric motor 100 is configured to provide a rotary motion utilizing a rotating electromagnetic field to impart a rotational motion on the ferromagnetic fluid 112. A rotational inertia of the ferromagnetic fluid 112 is transferred to the output shaft 110. This will allow for torque 116 to be applied to an output of the ferrofluid electric motor 100 with an only moving part being the ferromagnetic fluid 112.

The active electromagnet stator 102 is configured to generate an induced electromagnetic field 120 (FIG. 2) to flow 114 the ferromagnetic fluid 112. The induced electromagnetic field 120 may be generated at an angle 210 (FIG. 2) to the flow 114 of the ferromagnetic fluid 112. The angle 210 may comprise, for example but without limitation, a right angle (90 degrees), or other suitable angle. The active electromagnet stator 102 generates a rotating magnetic field such as the induced electromagnetic field 120 via an active stator coil 124 through the ferromagnetic fluid 112 and the passive stator 104. The induced electromagnetic field 120 imparts an electromagnetic force on (ferromagnetic or ferrimagnetic) particles in the ferromagnetic fluid 112, which exerts a pressure on the turbine 106. The ferromagnetic fluid 112 then imparts a mechanical force on the turbine 106 which causes the turbine 106 coupled to the output shaft 110 to rotate.

The active electromagnet stator 102 may comprise a plurality of electromagnets 124/212 (FIG. 2) and 302 (FIG. 3) configured to rotate the induced electromagnetic field 120 respectively in the contained volume 108 in a direction of the flow 114 of the ferromagnetic fluid 112. The electromagnets 124/212/302 of the active electromagnet stator 102 may be controlled to move (rotate) the induced electromagnetic field 120 from each of the electromagnets 124/212/302 in a circular rotation around the output shaft 110. The circular rotation of the induced electromagnetic field 120 electromagnetically forces (e.g., by magnetically pushing and/or pulling) the ferromagnetic fluid 112 to flow around the output shaft 110 in a direction of the circular rotation, i.e., the direction of the flow 114.

The passive stator 104 is configured to receive the induced electromagnetic field 120. The passive stator 104 is configured to contain the induced electromagnetic field 120 between the passive stator 104 and the active stator back iron 202.

The turbine 106 is coupled to the output shaft 110 and is configured to rotate in response to the mechanical force imparted from the flow 114 of the ferromagnetic fluid 112 as mentioned above.

The contained volume 108 comprises a volume located between the active electromagnet stator 102 and the passive stator 104 and contains the ferromagnetic fluid 112, the flow 114 of the ferromagnetic fluid 112, and the turbine 106. The contained volume 108 may be substantially surrounded and/or contained by the active electromagnet stator 102, the passive stator 104, the magnetic shield housing 126, and the output shaft 110.

The output shaft 110 is configured to rotate in response to rotation of the turbine 106. The output shaft 110 protrudes from the magnetic shield housing 126 through a shaft seal 130 to prevent the ferromagnetic fluid 112 from leaking.

The ferromagnetic fluid 112 (ferrofluid 112) is configured to flow 114 in response to the induced electromagnetic field 120. The ferromagnetic fluid 112 provides rotational motion of the output shaft 110 using pressure generated by an influence of the induced electromagnetic field 120 on the ferromagnetic fluid 112 and generated by the active stator coil 124/212. In this manner, there is essentially zero gap between the active stator coil 124/212 and the ferromagnetic fluid 112 upon which it is reacting. The ferromagnetic fluid 112 may comprise, for example but without limitation, a colloidal mixture of ferromagnetic or ferrimagnetic particles suspended in a fluid, a mixture of fluid and suspended ferromagnetic or ferrimagnetic particles, a slurry of fluid and ferromagnetic or ferrimagnetic particles, or other suitable ferromagnetic fluid.

The ferromagnetic fluid 112 may comprise, for example but without limitation, nano-size iron particles, nano-size copper particles, a combination thereof, or other ferromagnetic or ferrimagnetic particles. The ferromagnetic fluid 112 may comprise, for example but without limitation, a carrier fluid, an organic solvent, water, or other suitable fluid. The ferromagnetic fluid 112 may comprise a surfactant to coat particles such as, but without limitation, oleic acid, tetramethylammonium hydroxide, citric acid, soy lecithin, or other surfactant.

The magnetic shield housing 126 is configured to house the contained volume 108, the ferromagnetic fluid 112, and the turbine 106. The magnetic shield housing 126 is coupled to the electromagnets 124/212/302. The magnetic shield housing 126 may be configured to contain a magnetic field within the magnetic shield housing 126.

Figure 2:
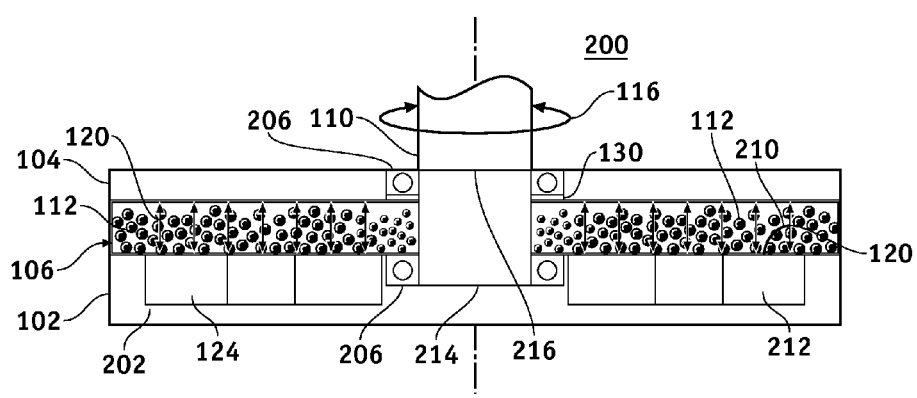
FIG. 2 is an illustration of a cross sectional view of the ferrofluid motor of FIG. 1 according to an embodiment of the disclosure.

FIG. 2 is an illustration of cross sectional view 200 of the ferrofluid electric motor 100 of FIG. 1 taken along a line AA 118 according to an embodiment of the disclosure. The cross sectional view 200 shows the active electromagnet stator 102, the passive stator 104, the turbine 106, the output shaft 110, the shaft seal 130, an active stator back iron 202, the active stator coil 124 (electromagnet 124), an active stator coil 212 (electromagnet 212), and bearings 206. FIG. 2 may have functions, material, and structures that are similar to the embodiments shown in FIG. 1. Therefore common features, functions, and elements may not be redundantly described here.

The active stator back iron 202 is configured to contain the induced electromagnetic field 120 between the passive stator 104 and the active stator back iron 202 when electric current is applied to the electromagnet 124 and the electromagnet 212.

The bearings 206 are configured to allow relative motion between the output shaft 110 and the turbine 106, and the active electromagnet stator 102.

The electromagnet 124 and the electromagnet 212 are coupled to an internal end 214 of the output shaft 110 of the ferrofluid electric motor 100.

The electromagnetic field 120 is generated by the electromagnet 124, and the electromagnet 212 respectively. The electromagnetic field 120 generates a rotational motion only on the ferromagnetic fluid 112 in contact with the electromagnet 124 and the electromagnet 212 to induce the flow 114 of the ferromagnetic fluid 112. The electromagnetic field 120 may also generate a rotational motion on the ferromagnetic fluid 112 within the electromagnetic field 120 of the electromagnet 124 and the electromagnet 212 to induce the flow 114 of the ferromagnetic fluid 112. The rotational motion of the flow 114 (FIG. 1) of the ferromagnetic fluid 112 is transferred to an external end 216 of the output shaft 110 of the ferrofluid electric motor 100 by the turbine 106. The turbine 106 is coupled to the external end 216 of the output shaft 110 and is in contact with the ferromagnetic fluid 112, thereby rotating with the flow 114 of the ferromagnetic fluid 112.

Figure 3:
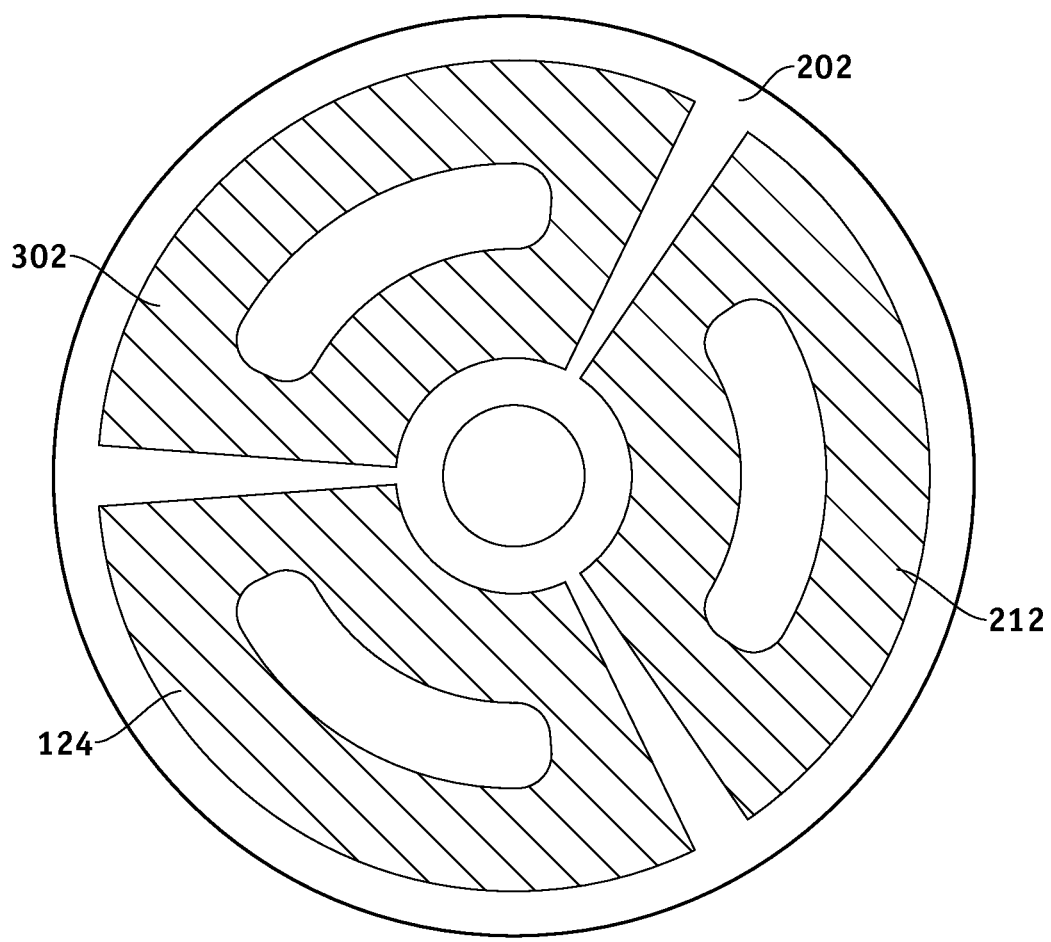
FIG. 3 is an illustration of a three phase active stator of the ferrofluid motor of FIG. 1 according to an embodiment of the disclosure.

FIG. 3 is an illustration of an exemplary three phase active stator 300 of the ferrofluid electric motor 100 of FIG. 1 that can be used as the active electromagnet stator 102 according to an embodiment of the disclosure. The three phase active stator 300 comprises the active stator back iron 202 (FIG. 2) a phase A coil 124, a phase B coil 212, and a phase C coil 302, placed on the active stator back iron 202.

The coils 124/212/302 are adjacent coils. Electromagnets are created when electricity flows through the coils 124/212/302. Thus coils 124/212/302 may also be referred to as the electromagnets 124/212/302. When electricity passes through the electromagnets 124/212/302, the induced electromagnetic field 120 (FIG. 2) is developed around the electromagnets 124/202/302. The phase A coil 124, the phase B coil 212, the phase C coil 302, coils 124/212/302, and electromagnets 124/212/302 may be used interchangeably in this document.

The induced electromagnetic field 120 is generated by the electromagnet 124/212/302, inducing the flow 114 of the ferrofluid 112 in response to the electromagnetic field 120. An induced electromagnetic field, and an electromagnetic field may be used interchangeably in this document. Similarly, ferrofuid and ferromagnetic fluid may be used interchangeably in this document. Any number of electromagnets suitable for operation of the ferrofluid electric motor 100 may be used.

Figure 4:
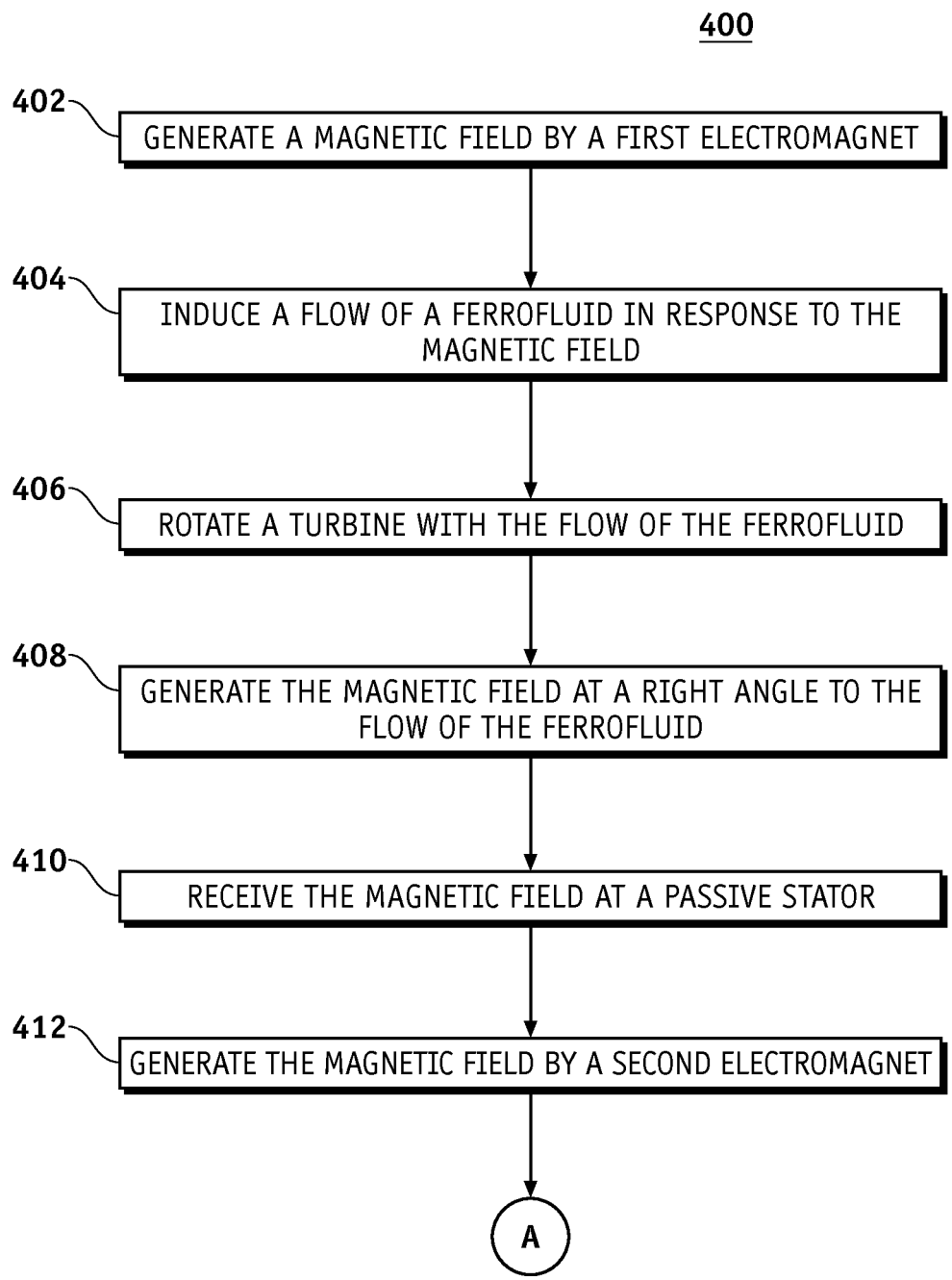
FIG. 4 is an illustration of an exemplary flowchart showing a process for operating a ferrofluid electrical motor according to an embodiment of the disclosure.
Figure 4:
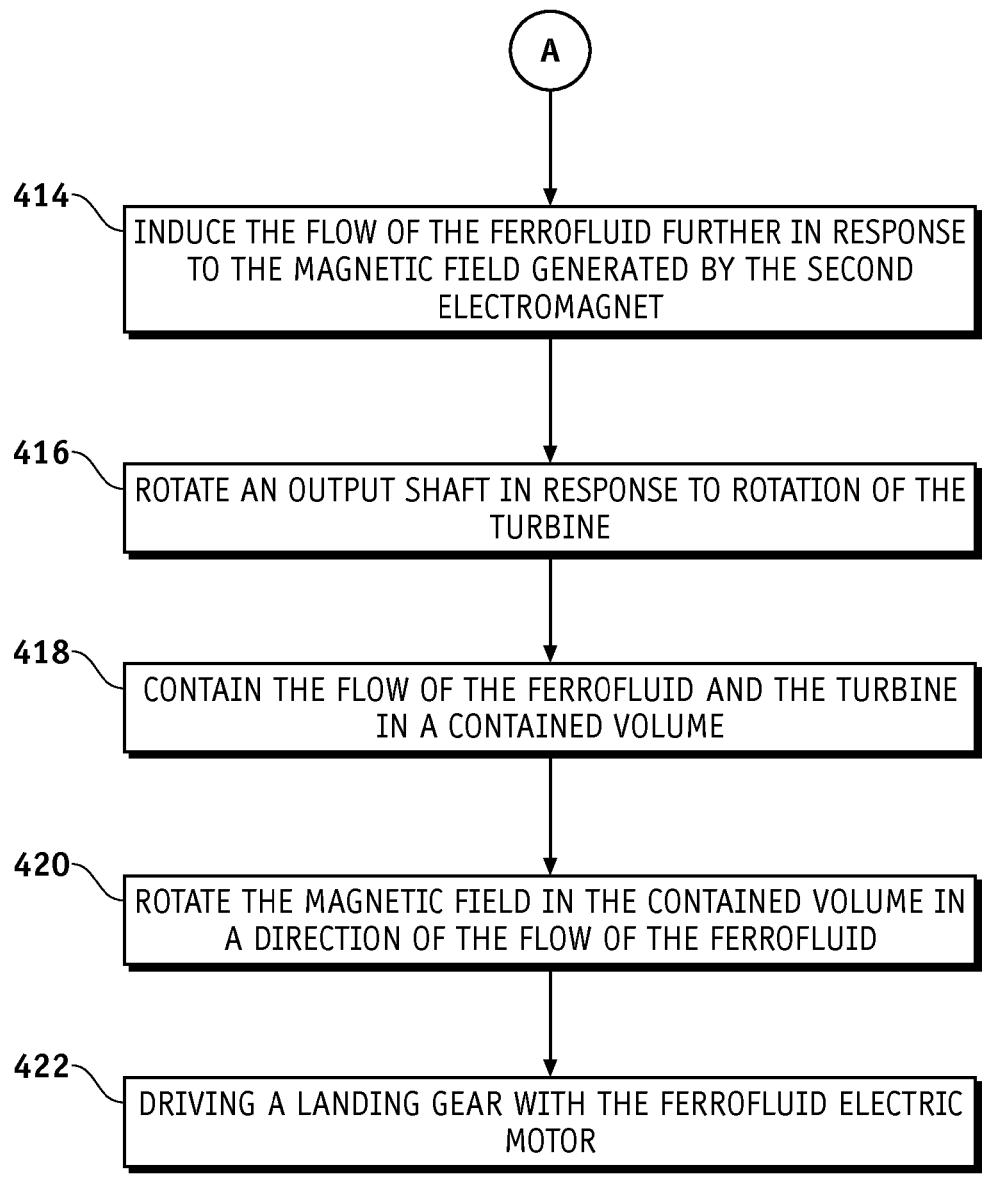

FIG. 4 is an illustration of an exemplary flowchart showing a process for operating a ferrofluid electric motor according to an embodiment of the disclosure. The various tasks performed in connection with process 400 may be performed mechanically, by software, hardware, firmware, or any combination thereof. For illustrative purposes, the following description of process 400 may refer to elements mentioned above in connection with FIGS. 1-3. In some embodiments, portions of the process 400 may be performed by different elements of the ferrofluid electric motor 100 such as: the active electromagnet stator 102, the passive stator 104, the turbine 106, the output shaft 110, the contained volume 108, the ferromagnetic fluid 112, the magnetic shield housing 126, etc. Process 400 may have functions, material, and structures that are similar to the embodiments shown in FIGS. 1-3. Therefore common features, functions, and elements may not be redundantly described here.

Process 400 may begin by generating a magnetic field such as the induced electromagnetic field 120 by a first electromagnet such as the electromagnet 124 (task 402).

Process 400 may continue by inducing a flow such as the flow 114 of a ferrofluid such as the ferrofluid 112 in response to the magnetic field 120 (task 404).

Process 400 may continue by rotating a turbine such as the turbine 106 with the flow 114 of the ferrofluid 112 (task 406).

Process 400 may continue by generating the magnetic field 120 at a right angle to the flow 114 of the ferrofluid 112 (task 408).

Process 400 may continue by receiving the magnetic field 120 at a passive stator such as the passive stator 104 (task 410).

Process 400 may continue by generating the magnetic field 120 by a second electromagnet such as the electromagnet 212 (task 412).

Process 400 may continue by inducing the flow 114 of the ferrofluid 112 further in response to the magnetic field 120 generated by the second electromagnet 212 (task 414).

Process 400 may continue by rotating an output shaft such as the output shaft 110 in response to rotation of the turbine 106 (task 416).

Process 400 may continue by containing the flow 114 of the ferrofluid 112 and the turbine 106 in a contained volume such as the contained volume 108 (task 418).

Process 400 may continue by rotating the magnetic field 120 in the contained volume 108 in a direction of the flow 114 of the ferrofluid 112 (task 420).

Process 400 may continue by driving a landing gear with the ferrofluid electric motor 100 (task 422). The landing gear may comprise an aircraft landing gear.

Figure 5:
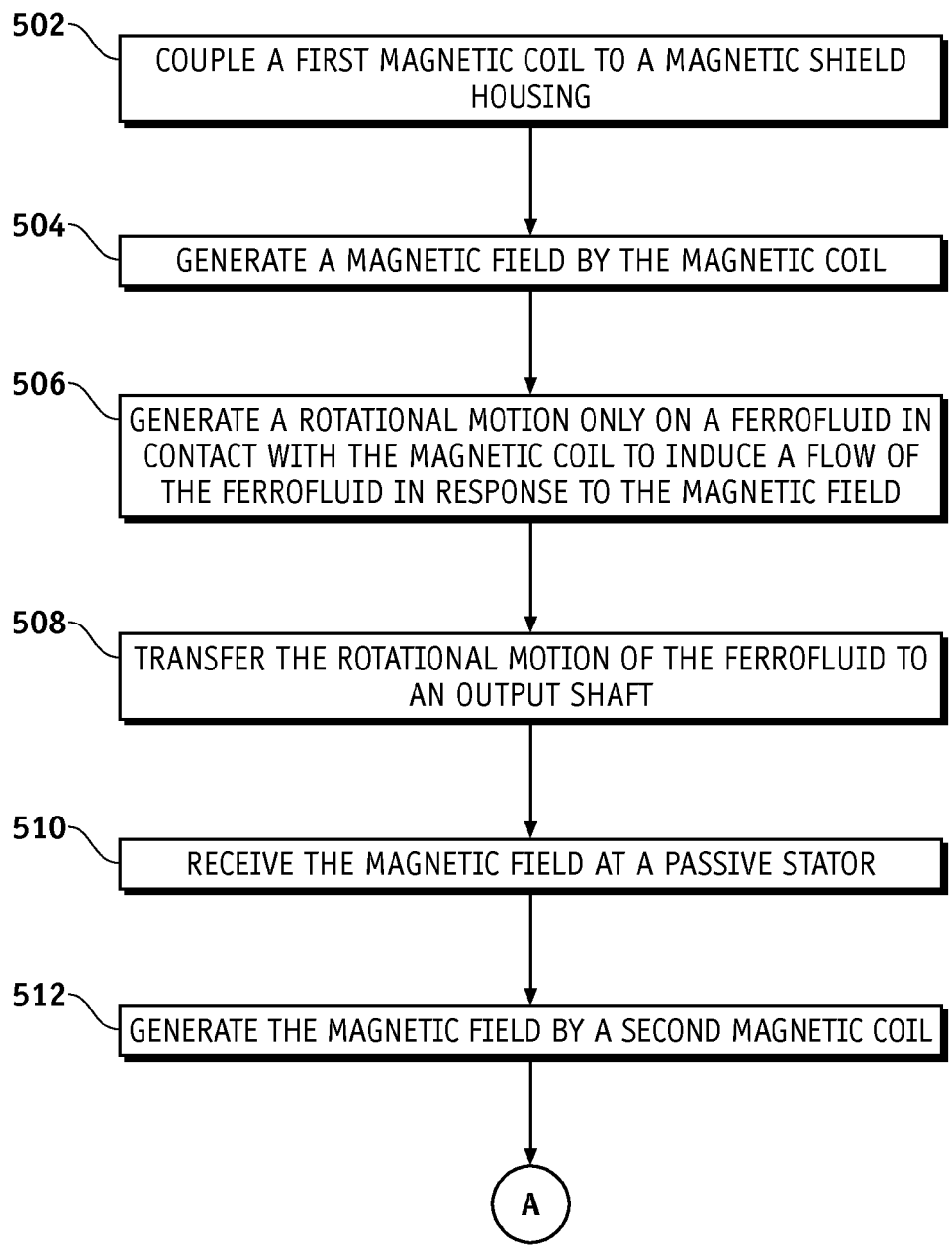
FIG. 5 is an illustration of an exemplary flowchart showing a process for producing a ferrofluid electrical motor according to an embodiment of the disclosure.
Figure 5:
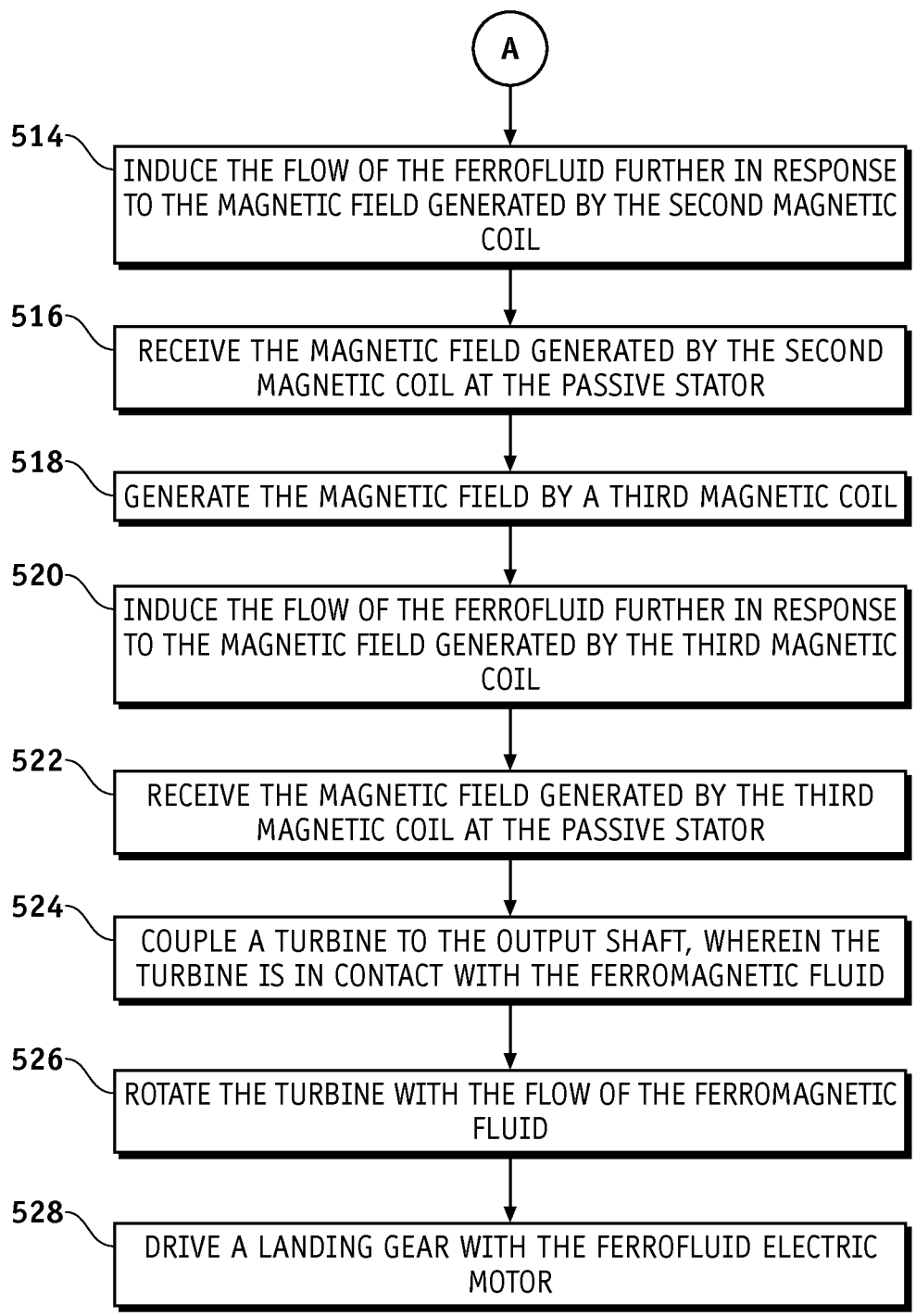

FIG. 5 is an illustration of an exemplary flowchart showing a process 500 for producing the ferrofluid electric motor 100 according to an embodiment of the disclosure. The various tasks performed in connection with process 500 may be performed mechanically, by software, hardware, firmware, or any combination thereof. For illustrative purposes, the following description of process 500 may refer to elements mentioned above in connection with FIGS. 1-3. In some embodiments, portions of the process 500 may be performed by different elements of the ferrofluid electric motor 100 such as: the active electromagnet stator 102, the passive stator 104, the turbine 106, the output shaft 110, the contained volume 108, the ferromagnetic fluid 112, the magnetic shield housing 126 etc. Process 500 may have functions, material, and structures that are similar to the embodiments shown in FIGS. 1-3. Therefore common features, functions, and elements may not be redundantly described here.

Process 500 may begin by coupling a first magnetic coil such as the phase A coil 124 to a magnetic shield housing such as the magnetic shield housing 126 (task 502).

Process 500 may continue by generating a magnetic field such as the induced electromagnetic field 120 by the magnetic coil 124/212/302 (task 504).

Process 500 may continue generating a rotational motion only on a ferrofluid such as the ferrofluid 112 in contact with the magnetic coil 124/212/302 to induce a flow such as the flow 114 of the ferrofluid 112 in response to the magnetic field 120 (task 506).

Process 500 may continue by transferring the rotational motion of the ferrofluid 112 to an output shaft such as the output shaft 110 (task 508).

Process 500 may continue by receiving the magnetic field 120 at a passive stator such as the passive stator 104 (task 510).

Process 500 may continue by generating the magnetic field 120 by a second magnetic coil such as the phase B coil 212 (task 512).

Process 500 may continue by inducing the flow 114 of the ferrofluid 112 further in response to the magnetic field 120 generated by the second magnetic coil 212 (task 514).

Process 500 may continue by receiving the magnetic field 120 generated by the second magnetic coil 212 at the passive stator 104 (task 516).

Process 500 may continue by generating the magnetic field 120 by a third magnetic coil such as the phase C coil 302 (task 518).

Process 500 may continue by inducing the flow 114 of the ferrofluid 112 further in response to the magnetic field 120 generated by the third magnetic coil 302 (task 520).

Process 500 may continue by receiving the magnetic field 120 generated by the third magnetic coil 302 at the passive stator 104 (task 522).

Process 500 may continue by coupling a turbine such as the turbine 106 to the output shaft 110, wherein the turbine 106 is in contact with the ferromagnetic fluid 112 (task 524).

Process 500 may continue by rotating the turbine 106 with the flow 114 of the ferromagnetic fluid 112 (task 526).

Process 500 may continue by driving a landing gear with the ferrofluid electric motor 100 (task 528).

Figure 6:
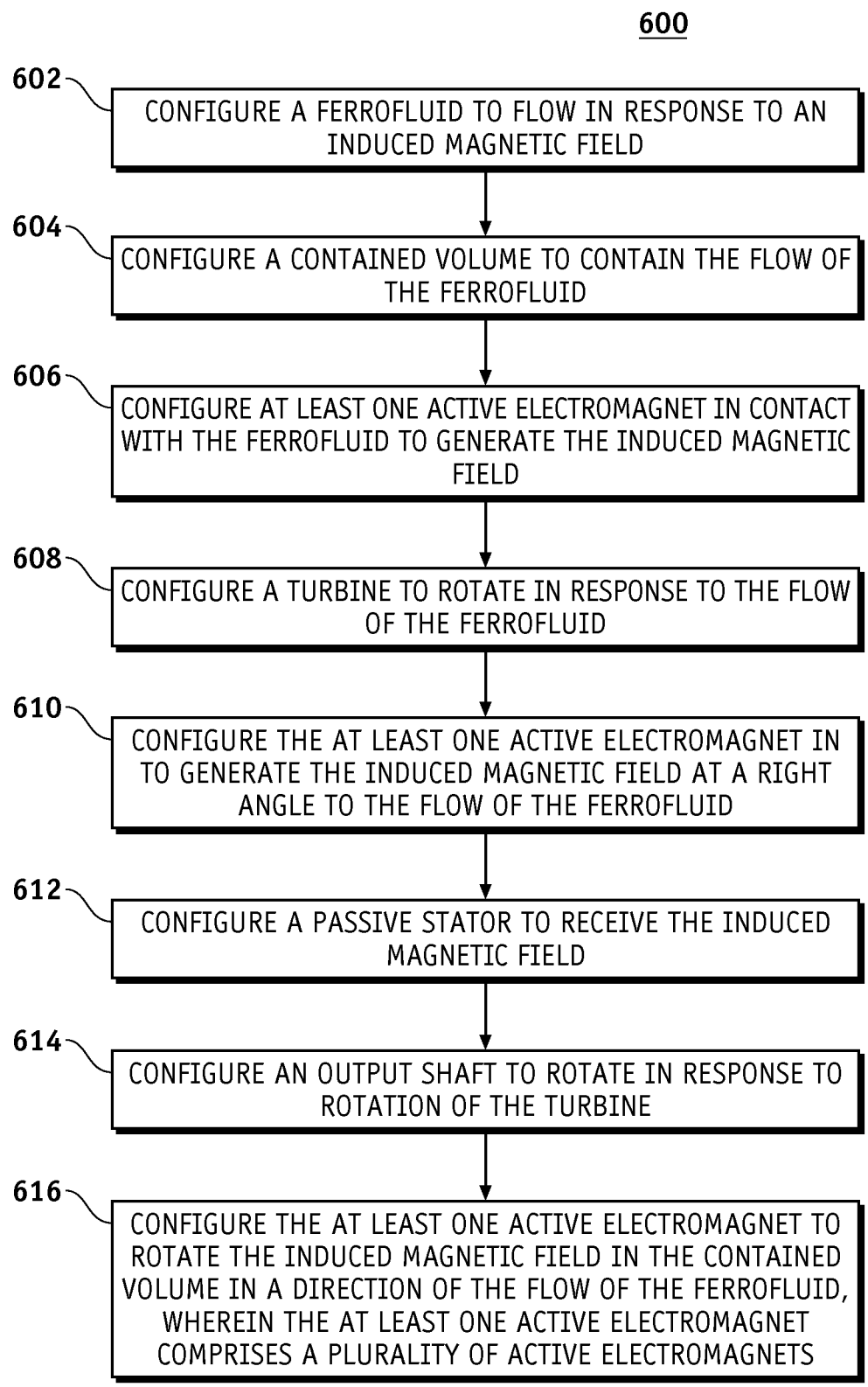
FIG. 6 is an illustration of an exemplary flowchart showing a process for producing a ferrofluid electrical motor according to an embodiment of the disclosure.

FIG. 6 is an illustration of an exemplary flowchart showing a process 600 for producing the ferrofluid electric motor 100 according to an embodiment of the disclosure. The various tasks performed in connection with process 600 may be performed mechanically, by software, hardware, firmware, or any combination thereof. For illustrative purposes, the following description of process 600 may refer to elements mentioned above in connection with FIGS. 1-3. In some embodiments, portions of the process 600 may be performed by different elements of the ferrofluid electric motor 100 such as: the active electromagnet stator 102, the passive stator 104, the turbine 106, the output shaft 110, the contained volume 108, the ferromagnetic fluid 112, the magnetic shield housing 126 etc. Process 600 may have functions, material, and structures that are similar to the embodiments shown in FIGS. 1-3. Therefore common features, functions, and elements may not be redundantly described here.

Process 600 may begin by configuring a ferrofluid such as the ferrofluid 112 to flow in response to an induced magnetic field such as the induced electromagnetic field 120 (task 602).

Process 600 may continue by configuring a contained volume such as the contained volume 108 to contain the flow 114 of the ferrofluid 112 (task 604).

Process 600 may continue by configuring at least one active electromagnet such as the electromagnet 124/212/302 in contact with the ferrofluid 112 to generate the induced magnetic field 120 (task 606).

Process 600 may continue by configuring a turbine such as the turbine 106 to rotate in response to the flow 114 of the ferrofluid 112 (task 608).

Process 600 may continue by configuring the at least one active electromagnet 124/212/302 to generate the induced magnetic field 120 at a right angle (e.g., 90 deg.) to the flow 114 of the ferrofluid 112 (task 610).

Process 600 may continue by configuring a passive stator such as the passive stator 104 to receive the induced magnetic field 120 (task 612).

Process 600 may continue by configuring an output shaft such as the output shaft 110 to rotate in response to rotation of the turbine 106 (task 614).

Process 600 may continue by configuring the at least one active electromagnet 124/212/302 to rotate the induced magnetic field 120 in the contained volume 108 in a direction such as the direction 114 of the flow 114 of the ferrofluid 114, wherein the at least one active electromagnet 124/212/302 comprises a plurality of active electromagnets 124/212/302 (task 616).

In this manner, embodiments provide rotational motion of the output shaft using pressure generated by an influence of an electromagnetic field on the ferrofluid generated by an active stator coil, allowing essentially zero gap between the active stator coil and the fluid upon which it is reacting with only moving part being the ferrofluid.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-6 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or"

should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for operating a ferrofluid electrical motor, the method comprising:
   generating a rotating magnetic field by a plurality of electromagnets;
   inducing a flow of a ferrofluid in response to the rotating magnetic field, where the ferrofluid comprises a liquid which becomes magnetized in a presence of a magnetic field; and
   rotating a turbine by the flow of the ferrofluid.

2. The method of claim 1, further comprising generating the rotating magnetic field at a right angle to the flow of the ferrofluid.

3. The method of claim 1, further comprising receiving the rotating magnetic field at a passive stator.

4. The method of claim 1, wherein the plurality of electromagnets comprises a first and second electromagnet, the method further comprising:
   generating the rotating magnetic field by the first and second electromagnets.

5. The method of claim 1, further comprising rotating an output shaft in response to rotation of the turbine.

6. The method of claim 1, further comprising containing the flow of the ferrofluid and the turbine in a contained volume.

7. The method of claim 6, further comprising rotating the rotating magnetic field in the contained volume in a direction of the flow of the ferrofluid.

8. The method of claim 1, further comprising driving a landing gear with the ferrofluid electric motor.

9. A ferrofluid electric motor configured to perform the method of claim 1 and comprising:
   the ferrofluid, wherein the ferrofluid is configured to flow in response to the rotating magnetic field;
   a contained volume configured to contain the flow of the ferrofluid;
   the plurality of electromagnets, wherein the plurality of electromagnets are configured to generate the rotating magnetic field; and
   the turbine, wherein the turbine is configured to rotate in response to the flow of the ferrofluid.

10. The ferrofluid electric motor of claim 9, wherein the rotating magnetic field is generated at a right angle to the flow of the ferrofluid.

11. The ferrofluid electric motor of claim 9, further comprising a passive stator configured to receive the rotating magnetic field.

12. The ferrofluid electric motor of claim 9, further comprising an output shaft configured to rotate in response to rotation of the turbine.

13. The ferrofluid electric motor of claim 9, wherein the plurality of electromagnets are configured to rotate the rotating magnetic field in the contained volume in a direction of the flow of the ferrofluid.

14. The ferrofluid electric motor of claim 9, wherein the ferrofluid is configured to be in contact with at least one active electromagnet.

15. The ferrofluid electric motor of claim 9, wherein the ferrofluid electric motor is configured to drive a landing gear.

16. A method comprising:
   producing a ferrofluid electrical motor configured to perform the method of claim 1, wherein producing the ferrofluid electrical motor comprises:
   configuring the ferrofluid to flow in response to the rotating magnetic field;
   configuring a contained volume to contain the flow of the ferrofluid;
   configuring the plurality of electromagnets to generate the rotating magnetic field; and
   configuring the turbine to rotate in response to the flow of the ferrofluid.

17. The method of claim 16, further comprising configuring the plurality of electromagnets to generate the rotating magnetic field at a right angle to the flow of the ferrofluid.

18. The method of claim 16, further comprising configuring a passive stator to receive the rotating magnetic field.

19. The method of claim 16, further comprising configuring an output shaft to rotate in response to rotation of the turbine.

20. The method of claim 16, further comprising configuring the plurality of electromagnets to rotate the magnetic field in the contained volume in a direction of the flow of the ferrofluid.

* * * * *